(12) United States Patent
Hariharan et al.

(10) Patent No.: US 6,441,123 B1
(45) Date of Patent: Aug. 27, 2002

(54) VIBRATION DAMPING MONOLITHIC POLYMERS

(75) Inventors: Ramesh Hariharan, Guilderland; Gary Charles Davis, Albany, both of NY (US); Suresh Subramanian, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/705,295

(22) Filed: Nov. 3, 2000

Related U.S. Application Data

(60) Provisional application No. 60/208,139, filed on May 31, 2000.

(51) Int. Cl.$^7$ .............................................. C08G 64/00
(52) U.S. Cl. ....................................... 528/196; 528/198
(58) Field of Search ................................... 528/196, 198

(56) References Cited

U.S. PATENT DOCUMENTS

| | | | | |
|---|---|---|---|---|
| 5,972,461 A | * | 10/1999 | Sandstrom | 428/64.3 |
| 5,993,930 A | * | 11/1999 | Hector et al. | 428/64.1 |
| 6,001,953 A | | 12/1999 | Davis et al. | |
| 6,060,577 A | | 5/2000 | Davis | |
| 6,139,933 A | * | 10/2000 | Van Wijk | 428/64.1 |

* cited by examiner

*Primary Examiner*—Terressa M. Boykin
(74) *Attorney, Agent, or Firm*—Bernadette M. Bennett; Noreen C. Johnson

(57) ABSTRACT

The damping performance of an article and a polycarbonate composition is improved and a storage medium for data is provided which comprises the use of at least one ortho-methyl substituted polycarbonate structure.

101 Claims, 8 Drawing Sheets

VIBRATION DAMPING MONOLITHIC POLYMERS

CROSS-REFERENCE TO RELATED APPLICATIONS

This application claims priority to Provisional Application No. 60/208,139 entitled "Polycarbonates for Use in First Surface Applications," filed on May 31, 2000 which is incorporated herein by reference.

BACKGROUND OF THE INVENTION

The present invention relates to monolithic vibration damping materials comprising a polymer. The invention further relates to data storage medium prepared from the vibration damping materials.

Vibration damping is a common need in many mechanical systems where undesired resonances may be excited by normal perturbations. The suspension system in an automobile, for example, will exhibit large unwanted oscillations in response to road irregularities unless properly damped. Vibration dampers used in automobiles consist of springs providing shock and vibration isolation to a motor vehicle seat assembly.

Layers of elastomeric materials that absorb energy are other types of damping material. Polyethylene, polypropylene, non conjugated dienes, rubber cross linkers and similar materials are used in these vibration systems. Composites of metal and polymer are employed on the outside of many computer hard disk drives to reduce the noise of the drive within the computer. Vibration dampers are also used in printed circuit boards and spindle motors in internal disk drive applications. In particular, vibration damping materials are used to guard the interior of a disk drive from external shock forces.

Materials used for vibration damping should exhibit large viscous losses in response to deformation. These losses are typically quantified in terms of either dynamic Young's moduli or dynamic shear moduli. In either case, the dynamic storage modulus, by definition, is proportional to the amplitude of the stress which results in response to a sinusoidal strain applied in phase with the stress (where the strain may be either shear or elongational depending on whether shear or Young's modulus is desired respectively). Similarly, the loss modulus is, by definition, proportional to the amplitude of the stress which results in response to the application of a sinusoidal strain rate applied out of phase with the stress. The ratio of dynamic shear loss modulus to dynamic shear storage modulus, or dynamic Young's loss modulus to dynamic Young's storage modulus, at a particular oscillation frequency, is commonly referred to as tan δ. The magnitude of the loss modulus in a material quantifies its viscous-like resistance to deformation while tan δ quantifies the relative magnitude of this resistance to elastic response.

Due to a wide range of possible applications, there has been an intense research in polymer systems capable of damping out vibrations. Most polymer systems have a low fundamental vibration frequency. Many of these systems employ an elastomer in combination with a glassy polymer, metal, or combination thereof which are in contrast to single phase homogenous materials, i.e. monolithic systems. Monolithic polymers have the advantage of better surface smoothness. Thus, it would be desirable to develop damping systems which offer damping at room temperature without the use of a dispersed rubbery phase or blocky copolymer. "Blocky copolymer" as used herein refers to multiple phase polymer systems with alternating monomer sequences that may be of varying length.

One area in which there has been intense research in polymer systems capable of damping out vibrations is in "first surface" medium. Unlike compact disks (CD) and digital video disks (DVD), storage medium having high areal density capabilities, typically greater than 5 Gigabits per square inch, employ first surface or near field read/write techniques in order to increase the areal density. "First surface" as used herein refers to the data layer which is on the surface of a substrate wherein an optic does not pass through the substrate. "Near field read/write techniques" as used herein refers to an optical mechanism wherein the number aperture is greater than about 0.08. For such storage medium, although the optical quality is not relevant, the physical and mechanical properties of the substrate become increasingly important. For high areal density applications, including first surface applications, the surface quality of the storage medium can affect the accuracy of the reading device, the ability to store data, and replication qualities of the substrate. Furthermore, the physical characteristics of the storage medium when in use can also affect the ability to store and retrieve data. For instance, if the axial displacement of the medium is too great, the axial displacement can inhibit the accurate retrieval of data and/or damage the read/write device. Thus, improved vibration performance may be achieved by either high modulus or high damping.

Conventionally, the issues described above in substrate have been addressed by utilizing metal, for example, aluminum, and glass substrates. These substrates are formed into a disk and the desired layers are disposed upon the substrate by various techniques.

Vibration concerns and high axial displacement are critical in the design of data storage devices, such as optical disk drives and hard disk drives. It would also be desirable to develop damping systems utilizing monolithic polymers which are suitable for use in data storage devices, in particular in substrate applications.

BRIEF SUMMARY OF THE INVENTION

The present invention provides a storage medium for data, the storage medium comprising:

1) a substrate comprising at least one polycarbonate portion, and
2) at least one data layer on the substrate;

the polycarbonate comprising at least one compound of structure (I), (IV), or combinations thereof:

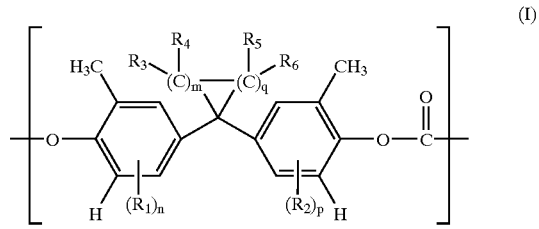

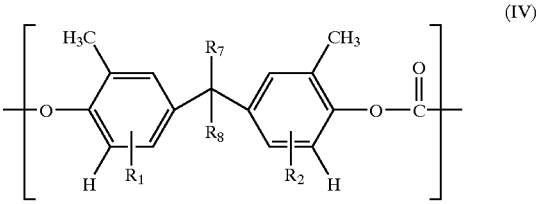

where
$R_1$, $R_2$, $R_3$, $R_4$, $R_5$, and $R_6$ are independently selected from the group consisting of $C_1$–$C_6$ alkyl and hydrogen;

$R_7$ and $R_8$ are independently selected from the group consisting of $C_1$–$C_6$ alkyl, phenyl, $C_1$–$C_6$ alkyl substituted phenyl, or hydrogen;

m is an integer in a range between 0 and about 12;

q is an integer in a range between 0 and about 12;

m+q is an integer in a range between about 4 and about 12;

n is an integer equal to 1 or 2; and p is an integer equal to 1 or 2.

The present invention further provides a polycarbonate composition with improved damping performance which comprises at least one compound of structure (I), (IV), or combinations thereof.

The present invention further provides a method for improving the damping performance of an article, the method comprising constructing the article of a polycarbonate with at least one compound of structure (I), (IV), or combinations thereof.

DETAILED DESCRIPTION OF THE INVENTION

Figure 1:
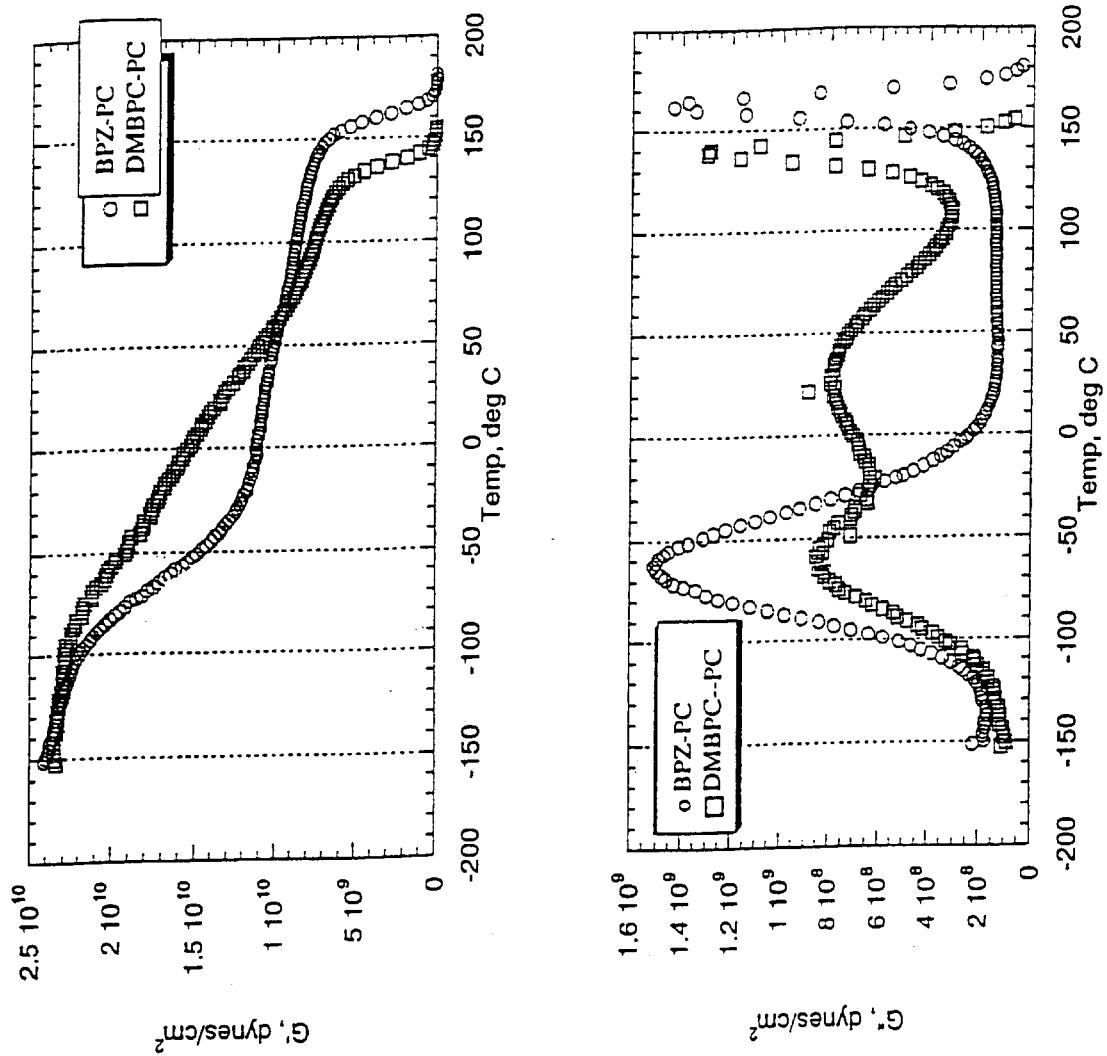
FIG. 1 is a plot of torsional storage and loss modulus of 1,1-bis(4-hydroxyphenyl)cyclohexane polycarbonate (BPZ-PC) and 1,1-bis(4-hydroxy-3-methyl phenyl) cyclohexane polycarbonate. (DMBPC-PC).

In this specification and in the claims that follow, reference will be made to a number of terms that shall be defined to have the following meaning.

The singular forms "a", "an" and "the" include plural referents unless the context clearly dictates otherwise.

"Optional" or "optionally" means that the subsequently described event or circumstance may or may not occur, and that the description includes instances where said event or circumstance occurs and instances where it does not.

"Monolithic" as used herein means that the referenced materials are single phase, homogeneous materials.

The terms "axial displacement" and "deflection" are used interchangeably.

"Ambient temperature" is in the range between about 0° C. and about 60° C.

"BCC" and "DMBPC" are synonomous terms and are herein defined as 1,1-bis(4-hydroxy-3-methyl phenyl) cyclohexane. DMBPC-PC is the polycarbonate made from the 1,1-bis(4-hydroxy-3-methyl phenyl) cyclohexane monomer.

"BPA" is bisphenol A or 2,2-bis(4-hydroxyphenyl) propane. BPA-PC is the polycarbonate made from the 2,2-bis(4-hydroxyphenyl)propane monomer.

"SBI" is 6,6'-dihydroxy-3,3,3',3'-tetramethylspirobiindane. SBI-PC is the polycarbonate made from the 6,6'-dihydroxy-3,3,3',3'-tetramethylspirobiindane monomer.

"DMBPA" is 2,2-bis(4-hydroxy-3-methylphenyl) propane. DMBPA-PC is the polycarbonate made from the 2,2-bis(4-hydroxy-3-methyl)propane monomer.

"DEBPA" is 2,2-bis(4-hydroxy-3-ethyl)propane. DEBPA-PC is the polycarbonate made from the 2,2-bis(4-hydroxy-3-ethyl)propane monomer.

"bisAP" is 4,4'-(1-phenylethylidene)bisphenol. bisAP-PC is the polycarbonate made from the 4,4'-(1-phenylethylidene)bisphenol monomer.

"DMbisAP" is 4,4'-(1-phenylethylidene)bis(2-methylphenol). DMbisAP-PC is the polycarbonate made from the 4,4'-(1-phenylethylidene)bis(2-methylphenol) monomer.

"BPI" is 1,1-bis(4-hydroxyphenyl)-3,3,5-trimethylcyclohexane. BPI-PC is the polycarbonate made from the 1,1-bis(4-hydroxyphenyl)-3,3,5-trimethylcyclohexane monomer.

"DMBPI" is 1,1-bis(4-hydroxy-3-methylphenyl)-3,3,5-trimethylcyclohexane. DMBPI-PC is the polycarbonate made from the 1,1-bis(4-hydroxy-3-methylphenyl)-3,3,5-trimethylcyclohexane monomer.

"TMBPA" is 2,2-bis(4-hydroxy-3,5-dimethyl)propane. TMBPA-PC is the polycarbonate made from the 2,2-bis(4-hydroxy-3,5-dimethyl)propane monomer.

"BPZ" is 1,1-bis(4-hydroxyphenyl)cyclohexane. BPZ-PC is the polymer made from the 1,1-bis(4-hydroxyphenyl) cyclohexane monomer.

For optical or magnetic data storage, information may be stored on the surface of a polymer substrate and is herein referred to as the "data layer".

In one aspect, the present invention is directed to data storage medium comprised of a monolithic polymer material, the storage medium useful in high areal density applications.

In the present invention, it was unexpectedly found that a substrate comprising polymers disclosed herein exhibits favorable glassy state relaxations in the ambient temperature range, exhibits low axial displacement, and exhibits excellent damping characteristics. Low axial displacement may be achieved by either high modulus or high damping. Aluminum, a material known in the art for storage medium substrates, has a very high stiffness or modulus, a level above that which has been achieved with plastic substrates. The storage modulus of aluminum is about one order of magnitude higher than that of typical commercial plastics, such as LEXAN OQ polycarbonate, manufactured by GENERAL ELCTRIC. For effective damping, the material should absorb the energy, dissipate the energy, or combination thereof, of vibration transmitted through the material as heat energy converted as a result of planar shearing or bulk compression and expansion of the material.

Generally, in high areal density applications, i.e. about 5 Gigabits per square inch (Gbits/in$^2$) or greater, the read/write device is located relatively close to the surface of the storage medium (stand-off distance). In general, the higher the density sought, the closer the read/write device should be to the surface of the storage medium. Typically in these instances, the stand-off distance is generally less than about 0.3 millimeters (mm), and often less than about 760 nanometers (nm). For extremely high density, the read/write device is preferably extremely close, e.g., less than about 0.064 microns ($\mu$), often less than about 0.013$\mu$ from the surface. Consequently, the axial displacement of the substrate should be sufficiently less than a tolerable system axial displacement distance in order to prevent damage to the read/write device, storage medium surface during vibration, shock conditions, or combinations thereof. For example, for a disk (130 mm in outer diameter, 40 mm in inner diameter, and 1.2 mm in thickness) experiencing a sinusoidal gravitational loading of about 1 G (acceleration of gravity) and a resonant frequency of about 170 Hertz (Hz), an axial displacement in peak to peak measurement of less than about 250$\mu$ is preferred, with less than about 125$\mu$ especially preferred for instances when the primary concern is damage to the substrate, the read/write device, or combinations thereof. Preferably, an axial displacement in peak to peak measurement of about 500$\mu$ or less, with about 250$\mu$ or less preferred, is maintained to a shock maximum of about 25 G's with an application time in a range between about 2 milliseconds and about 10 milliseconds (msec) and maintaining such a displacement to about 35 G's preferred. However, in other instances, e.g., those with a larger standoff distance (e.g., the stand-off at about 0.30$\mu$ or more) damage to the head is not a dominating issue but rather, it is preferred to have a very low axial displacement, disk tilt, or combinations thereof to allow for the optics to remain in focus since they may be incapable of responding to rapid changes in focal length. Systems for reading data stored in substrate typically operate in a frequency range between about 1 Hz and about 500 Hz, and preferably in a range between about 100 Hz and about 200 Hz. Typically, the maximum radial tilt and tangential tilt are independently no more than about 1° each, and more typically less than about 0.30° each, measured in a resting state (i.e., not spinning).

The substrate axial displacement is a function of the disk size requirements (inner and outer radii, and thickness), its stiffness (flexural modulus) and density, Poisson's ratio, loss modulus, and storage modulus. As the disk's outer radius increases, the axial displacement of the disk under shock increases. As the disk thickness decreases, its sectional stiffness decreases while its axial displacement increases. Currently, the dimensions of storage medium are specified by the industry to enable their use in presently available storage medium reading/writing devices. The storage medium typically has an inner diameter in a range between about 15 mm and about 40 mm, an outer diameter in a range between about 65 mm and about 130 mm, an overall thickness in a range between about 0.8 mm and about 2.5 mm with a thickness up to about 1.2 mm typically preferred. Other diameters and thickness may be employed to obtain a stiffer architecture if necessary.

In some first surface applications, it is desirable to minimize the moment of inertia and maximize the flexural modulus and vibration damping capability of the substrate. The substrate must spin at high, and sometimes variable speeds, and a low moment of inertia reduces the load on the motors used in disk drives. It is desirable to use as small a motor as possible to reduce the size and power consumption of the drive. Assuming a fixed geometry of the disk, the only way to lower the moment of inertia is to lower the density of the disk. This can be achieved by forming the disk from a material of lower specific gravity. It is also desirable that the disk have a high flexural modulus in order to improve the dynamic flatness of the molded part.

The substrate of the present invention comprises a polycarbonate or copolycarbonate comprising structural units (I), (IV), or combinations thereof, having excellent damping characteristics and are suitable for use in substrate applications. In addition, the materials are suitable for formation of a molded disk of lower density and higher flexural modulus than conventional materials.

Representative units of structure (I) include, but are not limited, to residues of 1,1-bis(4-hydroxy-3-methylphenyl) cyclohexane (DMBPC); 1,1-bis(4-hydroxy-3-methylphenyl)cyclopentane; 1,1-bis(4-hydroxy-3-methylphenyl)cycloheptane; 1,1-bis(4-hydroxy-3-methylphenyl)-3,3,5-trimethylcyclohexane (DMBPI); and mixtures thereof. DMBPC is most preferred as structural units (I).

Representative units iof structure (IV) include, but are not limited, to residues of 2,2-bis(4-hydroxy-3-methylphenyl) propane (DMBPA); and 4,4'-(1-phenylethylidene)bis(2-methylphenol) (DMbisAP). Residues of DMBPA are most preferred as structural units (IV).

The substrate of the present invention, comprising carbonate structural units (I), (IV), or combinations thereof, exhibit good pit replication and high surface quality. In part, this results from the fact that the material is monolithic and does not require the addition of fillers to the polymer. Preferably the substrate has at least a portion of its surface with a surface roughness of less than about 10 angstroms, and more preferably less than about 5 angstroms. Roughness is typically measured on average over a 10 micron by 10 micron area and measured using an atomic force microscope.

In the present invention, it was found that it was critical that the monomer be substituted in the 3 and 3' positions with methyl groups and that the 5 and 5' positions are preferably not substituted.

In one embodiment of the present invention, the polymer is a polycarbonate of structure (I) wherein m+q is 5, and $R_3$, $R_4$, $R_5$, $R_6$ are H to form DMBPC as seen in structure (VI). The polymer comprises in a range between about 5 mol % and about 100 mol % of DMBPC and preferably, greater than about 40 mol % of DMBPC. DMBPC may be easily synthesized from cyclohexanone and ortho-cresol. A polycarbonate, comprising 100 mol % of structural units derived from DMBPC, is herein referred to as "DMBPC homopolycarbonate".

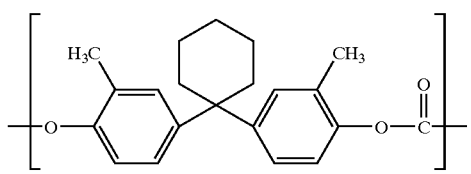

(VI)

In an alternative embodiment of the present invention, the substrate comprising the polycarbonate or copolycarbonate which comprises structural units (I), (IV), or combinations thereof, further comprises carbonate structural units (II):

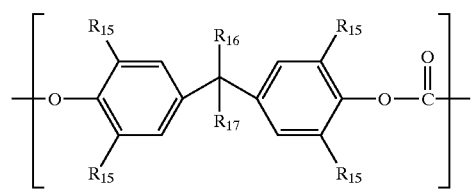

(II)

where each $R_{15}$ is selected independently from the group consisting of H and $C_1$–$C_3$ alkyl, and $R_{16}$ and $R_{17}$ are independently $C_1$–$C_6$ alkyl or aryl.

Representative units of structure (II) include, but are not limited to, residues of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl) propane; and mixtures thereof. BPA is preferred. It is preferable that the copolycarbonate of this embodiment comprises structural units (I), (IV), or combinations thereof in a range between about 5 mol % and about 99 mol %, and preferably, in a range between about 40 mol % and about 99 mol %.

In an even further embodiment of the present invention, the substrate comprising polycarbonate or copolycarbonate comprises structural units (I), (IV), or combinations thereof, further comprises carbonate structural units (III):

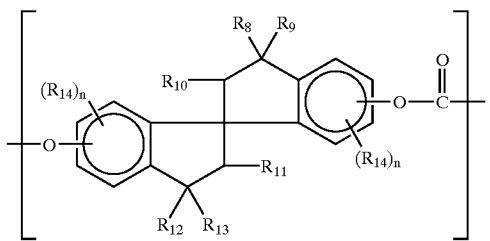

(III)

where
$R_8$, $R_9$, $R_{12}$ and $R_{13}$ are independently $C_1$–$C_6$ alkyl,
$R_{10}$ and $R_{11}$ are independently H or $C_1$–$C_5$ alkyl,
each $R_{14}$ is independently selected from the group consisting of H and $C_1$–$C_3$ alkyl and each n is independently selected from the group consisting of 0, 1 and 2.

Representative units of structure (III) include, but are not limited to, 6,6'-dihydroxy-3,3,3',3'-tetramethyl spirobiindane(SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3', 3'-tetramethylspirobiindane, and mixtures thereof. SBI is preferred. The copolycarbonate of this embodiment typically comprises structural units (I), (IV), or combinations thereof in a range between about 5 mol % and about 99 mol %, and preferably, in a range between about 40 mol % and about 99 mol %.

The number average molecular weight ($M_w$) of the polycarbonate or copolycarbonates, as determined by gel permeation chromatography relative to polystyrene, is preferably in a range between about 10,000 and about 100,000, more preferably in a range between about 10,000 and about 50,000, even more preferably in a range between about 12,000 and about 40,000.

For viscoelastic materials, such as plastic resins, there exists both a storage modulus and a loss modulus. Storage modulus represents elastic stiffness, and loss modulus represents viscous stiffness. In the present invention, the substrate, comprising a polycarbonate comprising structural units (I), (IV), or combinations thereof preferably has a mechanical damping coefficient defined as the ratio of the loss modulus over the storage modulus of at least about 0.04 at room temperature in a frequency range between about 1 Hz and about 500 Hz, more preferably about 0.1 at room temperature in a frequency range between about 1 Hz and about 500 Hz.

The storage medium described herein can be employed in conventional optic, magneto-optic, and magnetic systems, as well as in advanced systems requiring higher quality storage medium, high areal density, or combinations thereof. During use, the storage medium is disposed in relation to a read/write device such that energy (for instance, magnetic, light, electric, or a combination) contacts the data storage layer in the form of an energy field incident on the storage medium. The energy field contacts the data storage layer(s) disposed on the storage medium. The energy field causes some physical or chemical change in the storage medium so as to record the incidence of the energy at that point on the layer. For example, an incident magnetic field might change the orientation of magnetic domains within the layer or an incident light beam could cause a phase transformation where the light heats the material.

Numerous methods may be employed to produce the storage medium including, but not limited to, injection molding, foaming processes, sputtering, plasma vapor deposition, vacuum deposition, electrodeposition, spin coating, spray coating, meniscus coating, data stamping, embossing, surface polishing, fixturing, laminating, rotary molding, two shot molding, coinjection, over-molding of film, microcellular molding, and combinations thereof. Preferably, the technique employed enables in situ production of the substrate having the desired features, for example, pits and grooves. One such process comprises an injection molding-compression technique where a mold is filled with a molten polymer as defined herein. The mold may contain a preform, insert, etc. The polymer system is cooled and, while still in at least partially molten state, compressed to imprint the desired surface features arranged in spiral, concentric, or other orientation onto the desired portions of the substrate, i.e., one or both sides in the desired areas. The substrate is then cooled to room temperature.

For optical or magnetic data storage on a substrate, information stored is stored as at least one data layer on the surface of the substrate. This information may be imprinted directly onto the surface as pits, grooves, or combinations thereof (as in the case of a CD) or stored in a photo-, thermal-, or magnetically-definable medium which has been deposited onto the surface of the substrate.

The polycarbonates of the present invention may be prepared by the interfacial process, the melt process, or solid state process. If the interfacial process is used, the addition of various phase transfer catalysts is optional. Phase transfer catalysts which are suitable include, but are not limited to, tertiary amines, such as triethylamine; ammonium salts, such as tetrabutylammonium bromide; hexaethylguanidium chloride; or combinations thereof. Monofunctional phenols, such as p-cumylphenol and 4-butylphenol; long chain alkylphenols, such as cardanol and nonyl phenol; and difunctional phenols may be used as chain stopping agents. Optionally, chainstopping agent in a range between about 0.1 mol % and about 10 mol %, more preferably in a range between about 1 mol % and about 5 mol %, may be incorporated into the polycarbonate based on the total moles of the repeating units.

In some instances, the phosgenation conditions must be adjusted. In particular, the phosgenation conditions should be adjusted in cases where the formation of undesired cyclic oligomers is favored by the characteristic reactivity of the monomer which is related to monomer solubility in the reaction medium and monomer structure. In the case of DMBPC, for example, cyclic oligomer formation occurs to a greater extent under standard interfacial polymerization conditions than in the case of, for example, BPA. In polycarbonates containing substantially more than about 50 mol % of DMBPC, it is advantageous to use an excess of phosgene to promote the formation of linear bischloroformate oligomers which are converted to high molecular weight polymers by partial hydrolysis and polycondensation. Preferably excess phosgene is used in a range between about 20 mol % and about 200 mol %.

The polycarbonates of the present invention may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide, and heated under a vacuum according to a protocol in which the temperature is raised through a series of stages while the pressure in the headspace over the reaction mixture is lowered from ambient pressure to about 1 torr.

Suitable carbonate sources, catalysts, and reaction conditions are found in U.S. Pat. No. 5,880,248, and *Kirk-Othmer Encyclopedia of Chemical Technology*, Fourth Edition, Volume 19, pp. 585–600. The time of the stages and the temperature are such that mechanical losses of material through foaming and the like are avoided. Phenol and excess diphenyl carbonate are removed overhead to complete the polymerization process. The product high polymer is then isolated as a melt which may be compounded with other additives, such as stabilizers and mold release agents, prior to pelletization. The products produced by the melt process have reduced numbers of undissolved particles and reduced content of low molecular weight contaminants, such as cyclic oligomers, relative to the interfacially produced product.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in degrees Celsius (°C.) or is at room temperature, and pressure is at or near atmospheric.

The materials and testing procedures used for the results shown herein are as follows:

Preparation of BPZ Homopolycarbonate

Into a 500 mL Morton flask was placed BPZ (26.8 g, 100 mmol), p-cumylphenol (1.06 g, 5 mol %), 125 mL methylene chloride 90 mL of water and 125 uL of TEA. The pH was adjusted to 10.5 with 50 wt % NaOH. Phosgene was added at 0.6 g/min until 13.2 g were added (30 mol % excess). The reaction mixture was tested for chloroformates. If present, they were hydrolyzed by addition of DMBA (5 uL) (dimethylbutylamine). The polymer solution was separated from the brine, washed with aqueous hydrochloric acid, washed with water, and steam crumbed in a blender. $M_w$=31,400 (Polystyrene standards).

Preparation of DMBPC Homopolycarbonate

Into a 500 milliliters (mL) Morton flask was placed DMBPC (29.6 grams, 100 millimol), 125 mL methylene chloride and 90 mL of water. The pH was adjusted to 12.5 with 50 wt % sodium hydroxide (NaOH). Phosgene (10.0 g, 100 mmol) was added at 0.6 grams per minute (g/min), p-cumylphenol (1.48 g, 7 mol %) was added and phosgene was continued until 12.3 g were added (20 mol % excess). The pH was lowered to 10.5 (with phosgene) at which point 25 microliters ($\mu$L) of triethylamine (TEA) was added followed 5 min later with 25 $\mu$L TEA. The chloroformates lasted about 8 min from the original TEA addition. An additional 75 $\mu$L of TEA was added (125 $\mu$L total, about 1 mol %) followed by 4.5 g phosgene. The reaction mixture was tested for chloroformates. If present, they were hydrolyzed by addition of DMBA (5 $\mu$L) (dimethylbutylamine). The polymer solution was separated from the brine, washed with aqueous hydrochloric acid, washed with water, and steam crumbed in a blender. $M_w$=30,000 and $M_n$=11,300 (Polystyrene standards).

Several polycarbonates and their associated dimethyl counterparts were measured for torsional dynamic mechanics. FIG. 1 are plots of the loss and storage modulii measured from torsional dynamic mechanical measurements of BPZ and its associated di-methyl counterpart, DMBPC. A large beta-relaxation in the loss modulus near room temperature indicates a useful damping material (the peak-to-peak axial displacement is proportional to the inverse of the loss modulus).

Preparation of bisAP Homopolycarbonate

Into a 500 mL Morton flask was placed bisAP (29.0 g, 100 mmol), 125 mL methylene chloride and 90 mL of water. The pH was adjusted to 11.5 with 50 wt % NaOH. Phosgene (10.0 g, 100 mmol) was added at 0.6 g/min, p-cumylphenol (0.85 g, 4 mol %) was added and phosgene was continued until 12.3 g were added (20 mol % excess). The pH was lowered to 10.5 (with phosgene) at which point 25 $\mu$L of TEA was added followed 5 min later with 25 $\mu$L more TEA. The chloroformates lasted about 21 min from the original TEA addition. An additional 75 $\mu$L of TEA was added (125 $\mu$L total, about 1 mol %) followed by 4.5 g phosgene. The reaction mixture was tested for chloroformates. If present, they were hydrolyzed by addition of DMBA (5 $\mu$L) (dimethylbutylamine). The polymer solution was separated from the brine, washed with aqueous HCl, washed with water and steam crumbed in a blender. $M_w$=45,800 (Polystyrene standards).

Preparation of DMbisAP Homopolycarbonate

Into a 500 mL Morton flask was placed DMBPC (31.8 g, 100 mmol), 125 mL methylene chloride and 90 mL of water. The pH was adjusted to 12.5 with 50 wt % NaOH. Phosgene (10.0 g, 100 mmol) was added at 0.6 g/min, p-cumylphenol (0.84 g, 4 mol %) was added and phosgene was continued until 12.3 g were added (20 mol % excess). The pH was lowered to 10.5 (with phosgene) at which point 25 µL of TEA added followed 5 min later with 25 µL TEA. The chloroformates lasted about 20 min from the original TEA addition. An additional 75 uL of TEA was added (125 uL total, about 1 mol %) followed by 4.5 g phosgene. The reaction mixture was tested for chloroformates. If present, they were hydrolyzed by addition of DMBA (5 µL) (dimethylbutylamine). The polymer solution was separated from the brine, washed with aqueous hydrochloric acid, washed with water, and steam crumbed in a blender. Mw=43,900 (Polystyrene standards).

Figure 2:
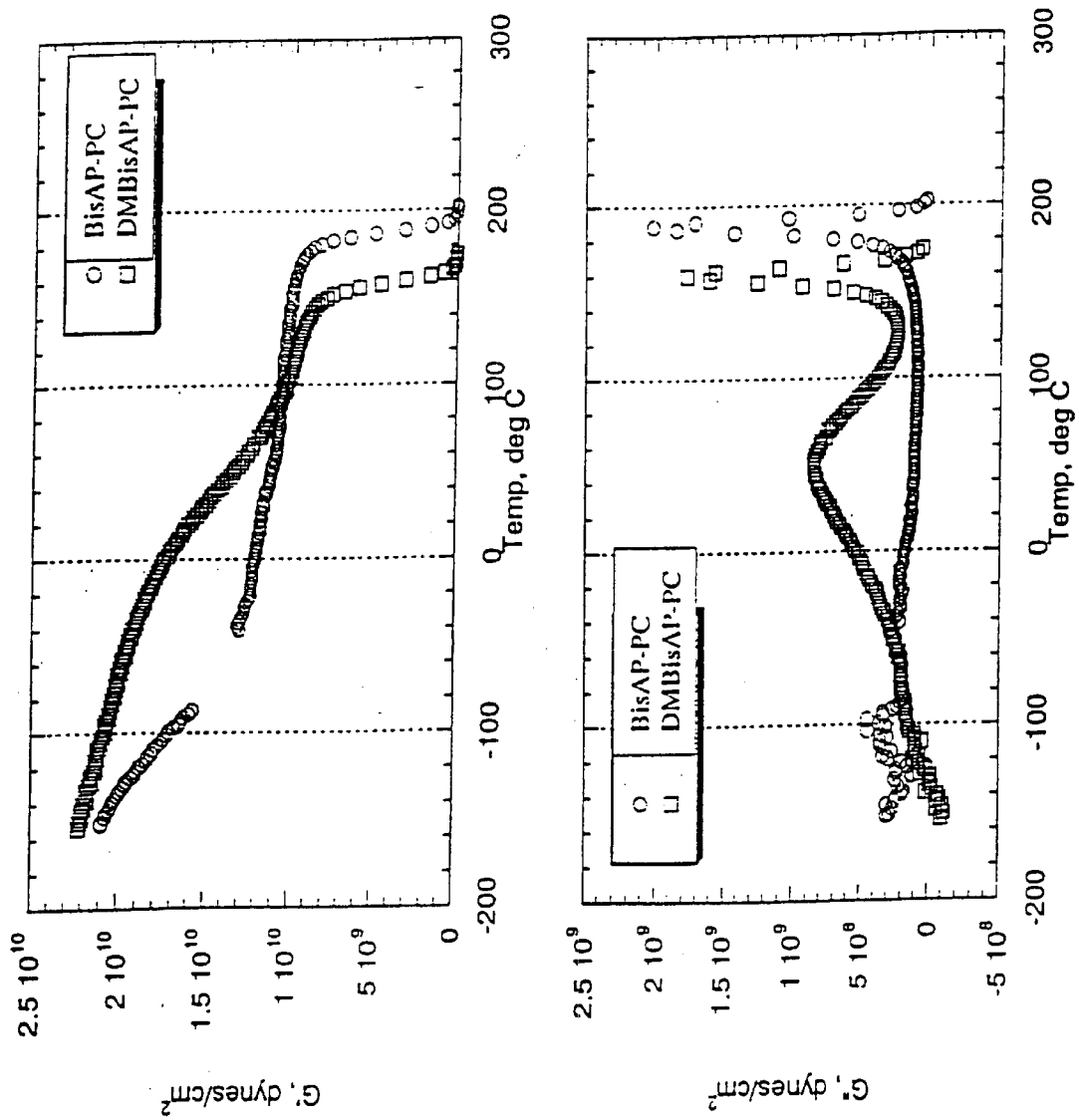
FIG. 2 is a plot of torsional storage and loss modulus of 4,4'-(1-phenylethylidene)bisphenol polycarbonate (bisAP-PC) and 4,4'-(1-phenylethylidene)bis(2-methylphenol) polycarbonate (DMbisAP-PC).

FIG. 2 are plots of the loss and storage modulii measured from torsional dynamic mechanical measurements of bisAP and its associated di-methyl counterpart, dmBisAP. A large beta-relaxation in the loss modulus near room temperature indicates a useful damping material (the peak-to-peak axial displacement is proportional to the inverse of the loss modulus).

Preparation of DMBPI Homopolycarbonate

Into a 500 mL Morton flask was placed DMBPI (16.9 g, 50 mmol), 100 mL methylene chloride and 80 mL of water. The pH was adjusted to 12.5 with 50 wt % NaOH. Phosgene (5.0 g, 50 mmol) was added at 0.6 g/min, p-cumylphenol (0.21 g, 2 mol %) was added and phosgene was continued until 6.0 g were added (20 mol % excess). The pH was lowered to 10.5 (with phosgene) at which point 25 µL of TEA was added followed 5 min later with 25 µL more TEA. The chloroformates lasted about 7 min from the original TEA addition. An additional 25 µL of TEA was added (125 µL total, about 1 mol %) followed by 3.5 g phosgene. The reaction mixture was tested for chloroformates. If present, they were hydrolyzed by addition of DMBA (5 µL) (dimethylbutylamine). The polymer solution was separated from the brine, washed with aqueous hydrochloric acid, washed with water, and steam crumbed in a blender. Mw=46,100 (Polystyrene standards).

The APEC 9351 is a copolymer (~60 mol % BPA and ~40 mol % BPI) produced by BAYER.

Figure 3:
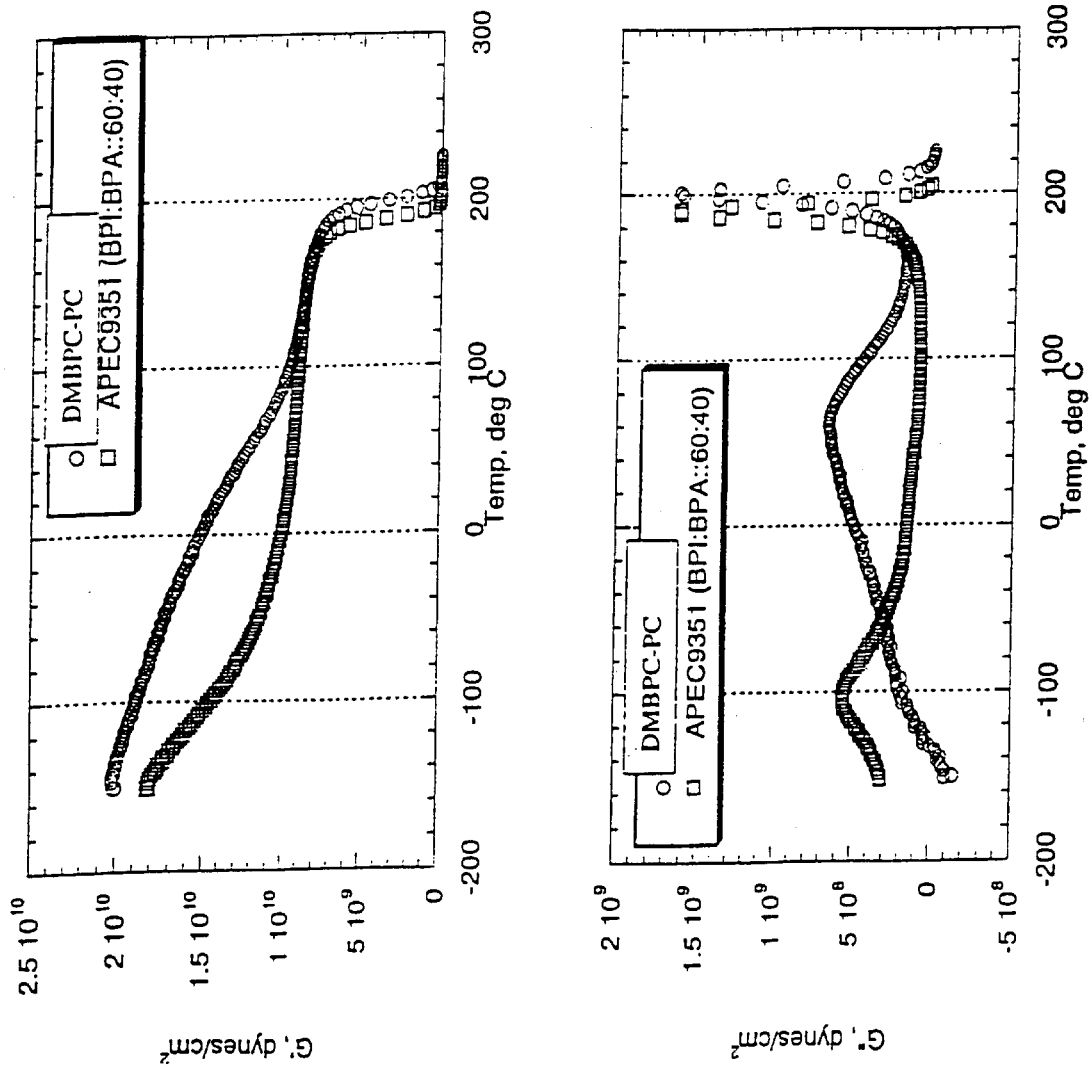
FIG. 3 is a plot of torsional storage and loss modulus of ,1-bis(4-hydroxy-3-methylphenyl)-3,3,5-trimethylcyclohexane polycarbonate (DMBPI-PC) and APEC 9351.

FIG. 3 are plots of the loss and storage moduii measured from torsional dynamic mechanical measurements of the polycarbonate and their associated di-methyl counterparts. A large beta-relaxation in the loss modulus near room temperature indicates a useful damping material (the peak-to-peak axial displacement is proportional to the inverse of the loss modulus). It is clear in FIGS. 1, 2, and 3 that the addition of the two methyl groups in the ortho position to the carbonate linkage significantly changed the loss modulus, increasing the magnitude of the beta relaxation peak and shifting the peak to temperatures around room temperature. As a result these methyl substituted polycarbonates are examples of materials with improved damping performance.

Preparation of DMBPA Homopolycarbonate

Into a 500 mL Morton flask was placed DMBPA (25.6 g, 100 mmol), 120 mL methylene chloride and 90 mL of water. The pH was adjusted to 10.5 with 50 wt % NaOH. Phosgene (10.0 g, 100 mmol) was added at 0.6 g/min, p-cumylphenol (1.27 g, 6 mol %) was added and phosgene was continued until 12.3 g were added (20 mol % excess). The pH was lowered to 10.5 (with phosgene) at which point 25 µL of TEA added followed 5 min later with 25 µL TEA. The chloroformates lasted about 10 min from the original TEA addition. An additional 75 uL of TEA was added (125 µL total, about 1 mol %) followed by 4.5 g phosgene. The reaction mixture was tested for chloroformates. If present, they were hydrolyzed by addition of DMBA (5 µL) (dimethylbutylamine). The polymer solution was separated from the brine, washed with aqueous hydrochloric acid, washed with water, and steam crumbed in a blender. Mw=31,000 (Polystyrene standards).

Preparation of TMBPA Homopolycarbonate

Into a 500 mL Morton flask was placed TMBPA (28.6 g, 100 mmol), 120 mL methylene chloride, 90 mL of water and MTBA (0.5 mL of a 75 wt % aqueous solution). The pH was adjusted to 12.0 with 50 wt % NaOH. Phosgene (11.2 g, 112 mmol, 10 mol % excess) was added at 0.6 g/min, p-cumylphenol (1.06 g, 5 mol %) was added and reaction stirred for 3 min. 100 µL of DMBA was added and the chloroformates lasted about 15 min. The polymer solution was separated from the brine, washed with aqueous hydrochloric acid, washed with water, and steam crumbed in a blender. Mw=32,400 (Polystyrene standards).

Figure 4:
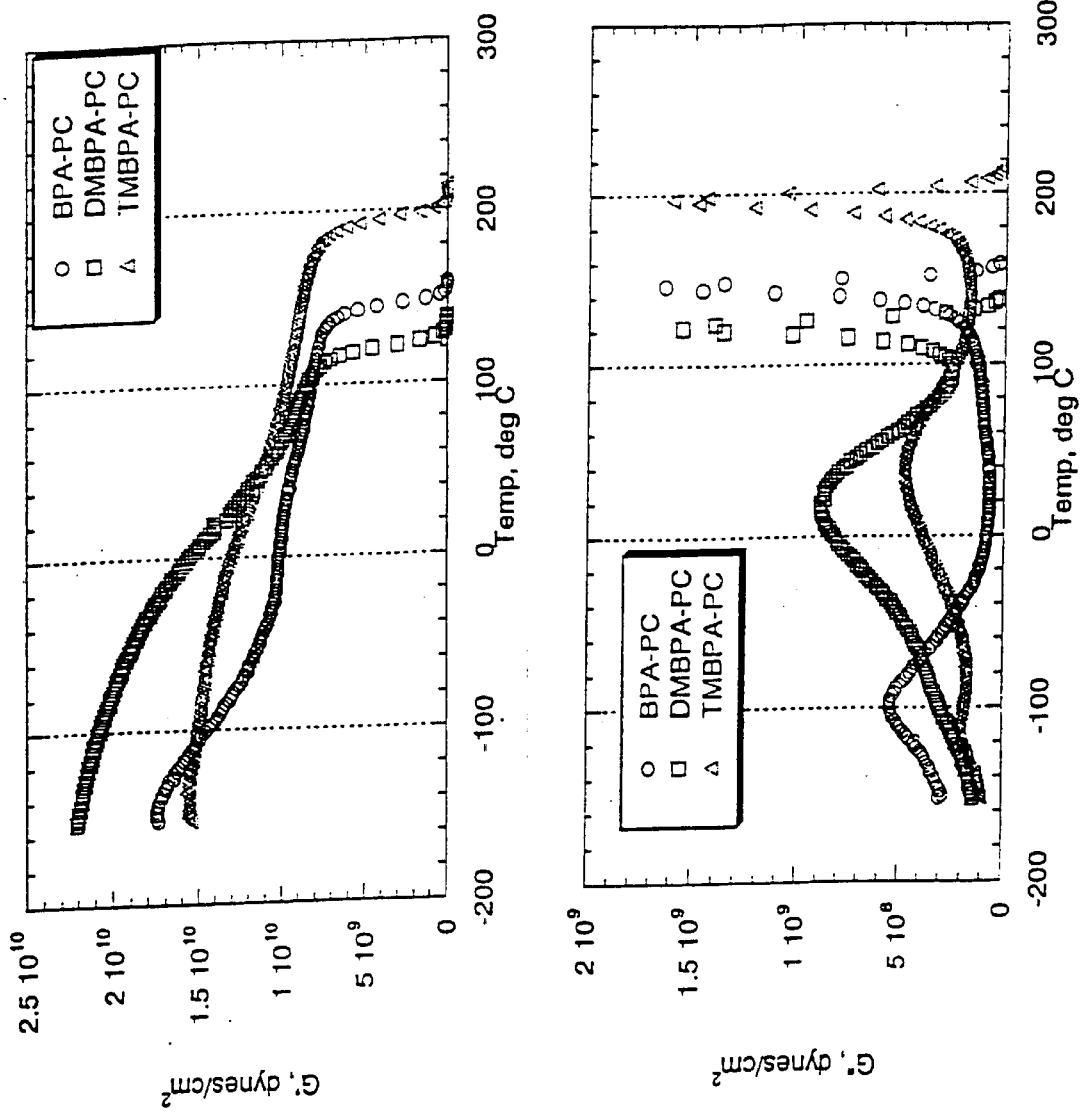
FIG. 4 is a plot of torsional storage and loss modulus of 2,2-bis(4-hydroxyphenyl)propane polycarbonate (BPA-PC), 2,2-bis(4-hydroxy-3-methyl)propane polycarbonate (DMBPA-PC), and 2,2-bis(4-hydroxy-3,5-dimethyl)propane polycarbonate (TMBPA-PC).

FIG. 4 shows that the progression of methyl substitution to BPA. The addition of two methyl groups to BPA to form DMBPA increases the loss modulus of the material near room temperature. However, further methyl substitution to form TMBPA reduces the loss modulus as compared to DMBPA, although still improves damping as compared to BPA.

Preparation of DEBPA Homopolycarbonate

Into a 500 mL Morton flask was placed DEBPA (24.8 g, 87.3 mmol), 120 mL methylene chloride and 90 mL of water. The pH was adjusted to 12.5 with 50 wt % NaOH. Phosgene (10.0 g, 100 mmol) was added at 0.6 g/min, p-cumylphenol (0.95 g, 4.5 mol %) was added and phosgene was continued until 12.2 g were added (20 mol % excess). The pH was lowered to 10.5 (with phosgene) at which point 25 uL of TEA was added followed 5 min later with 25 µL TEA. The chloroformates lasted about 10 min from the original TEA addition. An additional 75 µL of TEA was added (125 µL total, about 1 mol %) followed by 4.5 g phosgene. The reaction mixture was tested for chloroformates. If present, they were hydrolyzed by addition of DMBA (5 uL) (dimethylbutylamine). The polymer solution was separated from the brine, washed with aqueous hydrochloric acid, washed with water, and steam crumbed in a blender. Mw=38,500 (Polystyrene standards).

Figure 5:
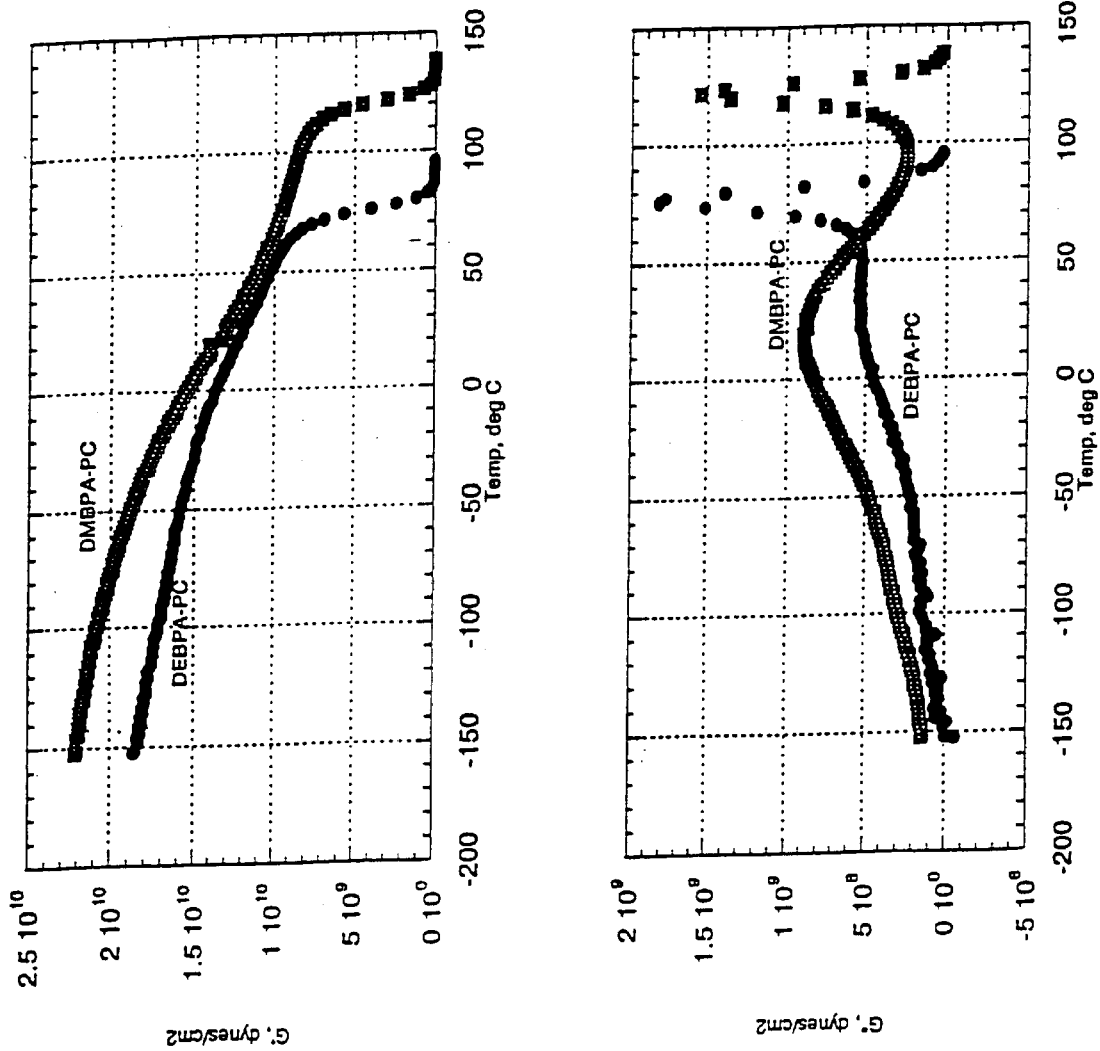
FIG. 5 is a plot of torsional storage and loss modulus of 2,2-bis(4-hydroxy-3-methyl)propane polycarbonate (DMBPA-PC) and 2,2-bis(4-hydroxy-3-ethyl)propane polycarbonate (DEBPA-PC).

The effect of increasing the length of the alkyl group from methyl to ethyl is shown in FIG. 5. Specifically, the ethyl substitution (DEBPA) decreases the loss modulus as compared to methyl substitution (DMBPA), suggesting that ethyl substitution does not improve the material's damping performance as compared to methyl substitution.

Preparation of DMBPC/BPA Copolycarbonate

Into a 500 mL Morton flask was placed DMBPC (17.8 g, 60 mmol), BPA (9.1 g, 40 mmol), 125 mL methylene chloride and 90 mL of water. The pH was adjusted to 10.5 with 50 wt % NaOH. Phosgene was added at 0.6 g/min, at 10.0 g (100 mmol), p-cumylphenol (1.06 g, 5 mol %) was added and phosgene was continued until 20.3 g (100 mol % excess) added. 125 uL of TEA was added and the chloroformates lasted about 12 minutes. An additional 125 uL of TEA was added (250 µL total, about 2 mol %) followed by 4.5 g more phosgene. The reaction mixture is tested for chloroformates. If present, they are hydrolyzed by addition of DMBA (5 µL) (dimethylbutylamine). The polymer solution was separated from the brine, washed with aqueous HCl, washed with water, and steam crumbed in a blender. Mw=33,300 (Polystyrene standards).

Figure 6:
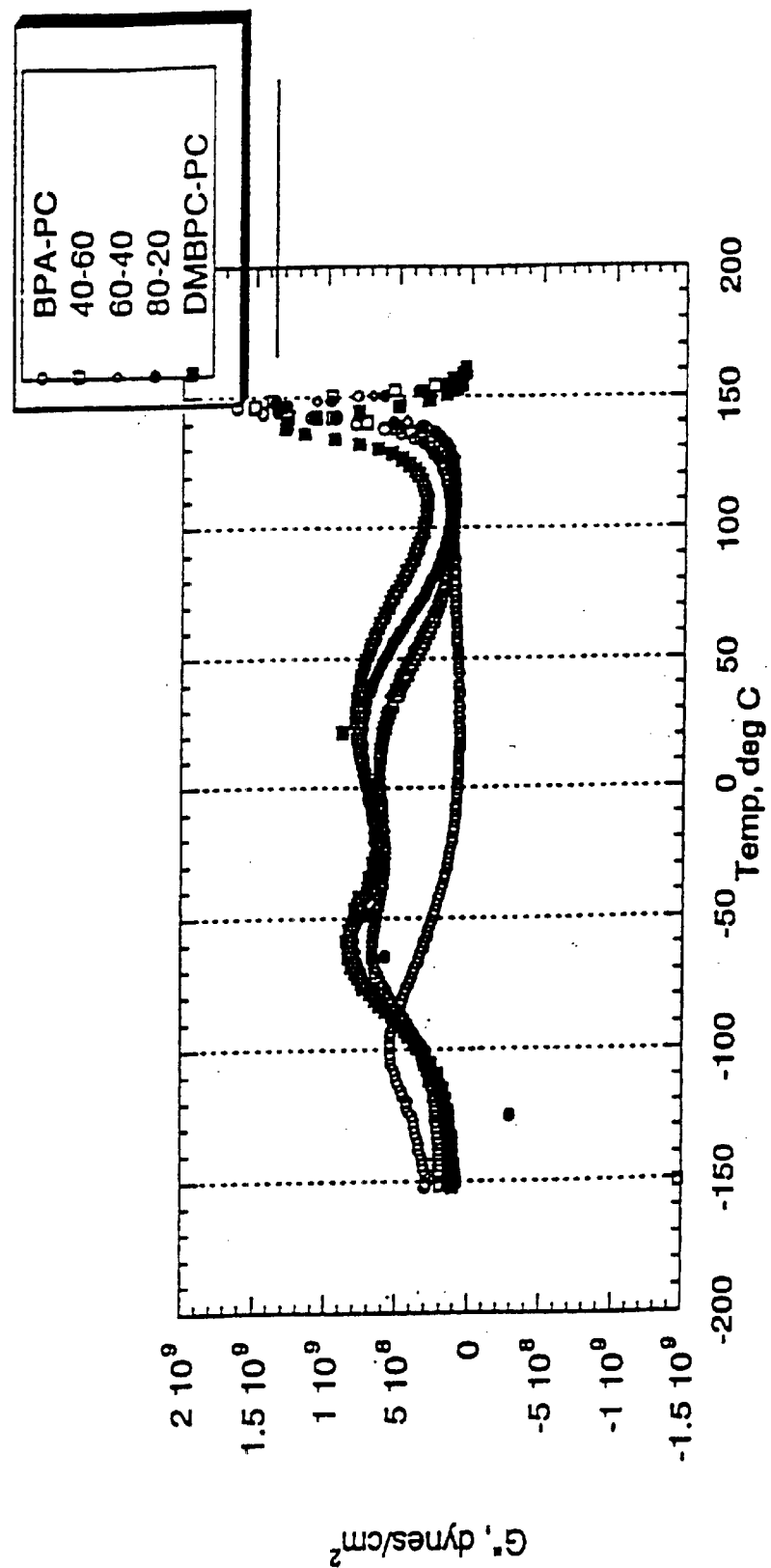
FIG. 6 is a plot of torsional dynamic mechanical measurements collected on 1,1-bis(4-hydroxy-3-methyl phenyl) cyclohexane polycarbonate (DMBPC-PC), 2,2-bis(4-hydroxyphenyl)propane polycarbonate (BPA-PC), and copolymers of DMBPC-PC with BPA-PC.

FIG. 6 shows torsional dynamic mechanical measurements collected on DMBPC and copolymers of DMBPC with BPA. Note that BPA, as with typical polycarbonates, fail to exhibit a beta relaxation in the loss modulus close to room temperature. As the mol % DMBPC is increased in the copolymer, the loss modulus near room temperature increases, as does the material's damping performance. A similar trend is observed in the copolymers of DMBPA, as shown in FIG. 7.

Preparation of DMBPA/BPA Copolycarbonate

Into a 500 mL Morton flask was placed DMBPA (12.8 g, 50 mmol), BPA (11.4 g, 40 mmol), p-cumylphenol (1.27 g, 6 mol %), 120 mL methylene chloride, 90 mL of water and 150 μL of TEA. The pH was adjusted to 10.5 with 50 wt % NaOH. Phosgene (13.2 g, 30 mol % excess) was added at 0.6 g/min. The reaction mixture is tested for chloroformates. If present, they are hydrolyzed by addition of DMBA (5 μL) (dimethylbutylamine). The polymer solution was separated from the brine, washed with aqueous HCl, washed with water, and steam crumbed in a blender. Mw=36,000 (Polystyrene standards).

Figure 7:
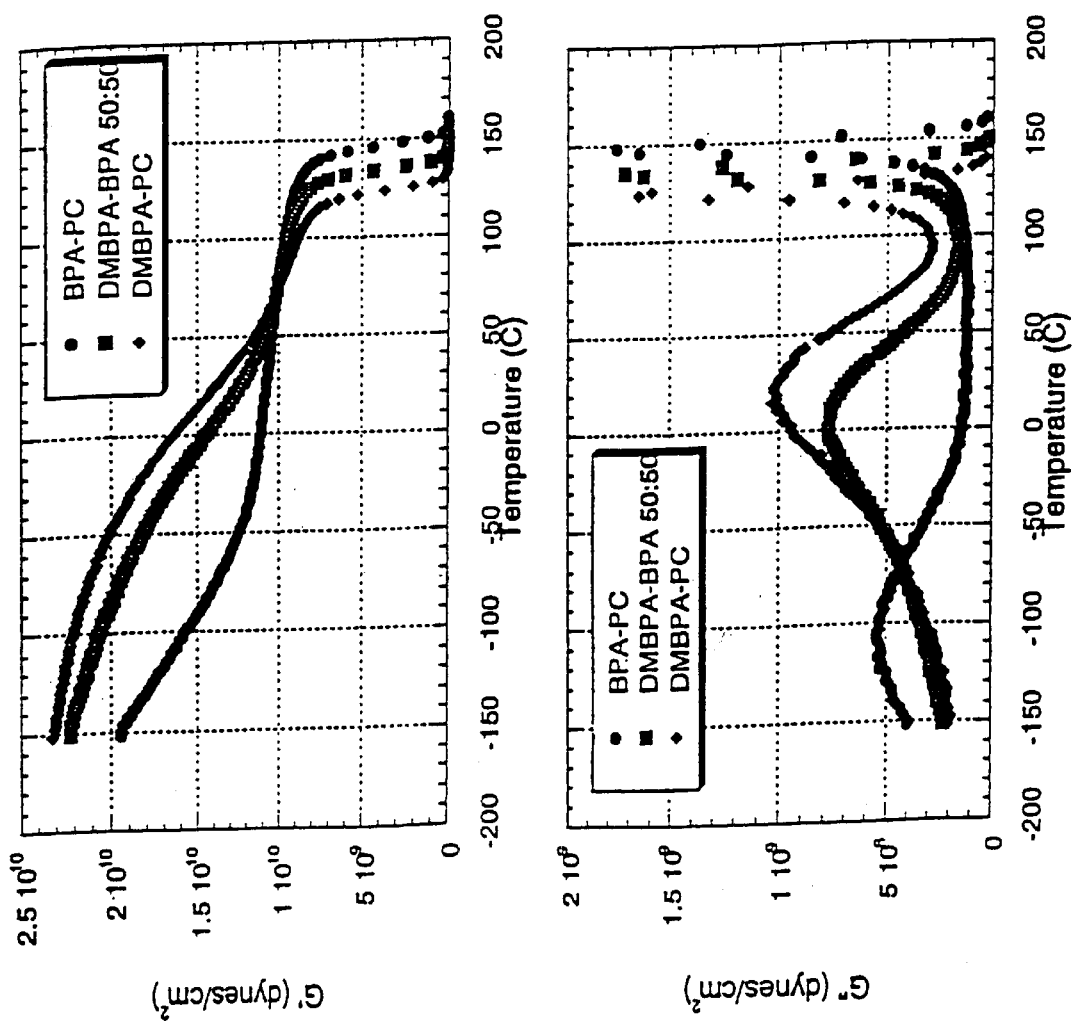
FIG. 7 is a plot of torsional dynamic mechanical measurements collected on 2,2-bis(4-hydroxyphenyl)propane polycarbonate (BPA-PC) and copolymers of 2,2-bis(4-hydroxy-3-methyl)propane polycarbonate (DMBPA-PC) and BPA-PC.

FIG. 7 shows torsional dynamic mechanical measurements collected on DMBPA and a 50:50 copolymer of DMBPA with BPA. Note that BPA, as with typical polycarbonates, fail to exhibit a beta relaxation in the loss modulus close to room temperature.

Torsional modulus measurements on the various material systems given above were conducted on a RHEOMETRICS DYNAMIC SPECTROSCOPE (model 7700) using a torsion rectangular fixture. The specimen used for these tests were nominally 2.5 inches long, 0.5 inches wide and 0.125 inches thick. The specimens were prepared by compression molding. All tests were conducted with specimen being subjected to 0.1% strain at a frequency of 10 radians per second. The samples were subjected to a thermal scan cycle from −150° C. to 150° C. at a heating rate of 2° C. per minute. The applied strain and load were measured continuously during the test and the storage modulus (G'), loss modulus (G") and tangent loss (tan δ) were calculated from this data.

The achievable gains from high modulus and damping was qualified by the transfer function which predicts the peak-to-peak axial displacements as:

$$\delta_{max}\text{Peak} - \text{Peak} = \frac{nc\gamma(1-v)}{2E''h^2}, \text{ and}$$

$$\omega_{m1} = b\sqrt{\frac{E'h^2}{\gamma(1-v^2)}}$$

where b and c were constants obtained independent of material properties from finite element analysis, E' was the storage modulus, E" (loss modulus) was a measure of material damping, v the Poissons ratio, γ the specific Gravity, h the disk thickness, $\omega_{m1}$ the first modal frequency, and n was the peak to peak "g" (acceleration) loading. The values for E', E", and tan delta were obtained from the FIGS. 1 through 7 to determine the dispersion and frequency of the respective materials. Table 1 is a summary of the results of the predicted values of axial displacement and natural frequency based on G' and G" measurements in torsion obtained at 25° C.

TABLE 1

| | Frequency 1.59 Hz | | | | |
|---|---|---|---|---|---|
| System | E' (psi) | E" (psi) | tan delta | Disp, inches | Freq, Hz |
| BPA-PC | 4.28E+05 | 3.11E+03 | 7.27E-03 | 9.65E-02 | 1.62E+02 |
| DMBPA-PC | 5.68E+05 | 4.10E+04 | 7.22E-02 | 7.32E-03 | 1.87E+02 |
| DEBPA-PC | 4.90E+05 | 2.14E+04 | 4.37E-02 | 1.40E-02 | 1.74E+02 |
| TMBPA-PC | 4.92E+05 | 1.86E+04 | 3.78E-02 | 1.61E-02 | 1.74E+02 |
| DMBPA:BPA 50:50 | 4.38E+05 | 2.40E+04 | 5.48E-02 | 1.25E-02 | 1.64E+02 |
| BPI-PC | 3.89E+05 | 5.79E+03 | 1.49E-02 | 5.18E-02 | 1.55E+02 |
| DMBPI-PC | 5.59E+05 | 2.34E+04 | 4.19E-02 | 1.28E-02 | 1.85E+02 |
| Bis-AP-PC | 5.59E+05 | 5.14E+03 | 9.19E-03 | 5.84E-02 | 1.85E+02 |
| DMBis-AP-PC | 5.59E+05 | 2.90E+04 | 5.19E-02 | 1.04E-02 | 1.85E+02 |
| BPA:DMBPC::60:40 | 4.70E+05 | 2.49E+04 | 5.30E-02 | 1.21E-02 | 1.70E+02 |
| BPA:DMBPC::40:60 | 4.66E+05 | 2.60E+04 | 5.58E-02 | 1.15E-02 | 1.69E+02 |
| BPA:DMBPC::20:80 | 5.35E+05 | 3.24E+04 | 6.06E-02 | 9.27E-03 | 1.81E+02 |
| DMBPC-PC | 5.79E+05 | 3.48E+04 | 6.01E-02 | 8.63E-03 | 1.89E+02 |

*E refers to exponent

It is clear from these results of the predicted vibration response of the 130 mm disks that the maximum axial displacement of disks were significantly reduced under vibration loading in all the ortho-methyl substituted material systems. The BPA-DMBPC and BPA-DMBPA copolymers also exhibit very good vibration performance as indicated by the axial displacement and E" in comparison to BPA.

Figure 8:
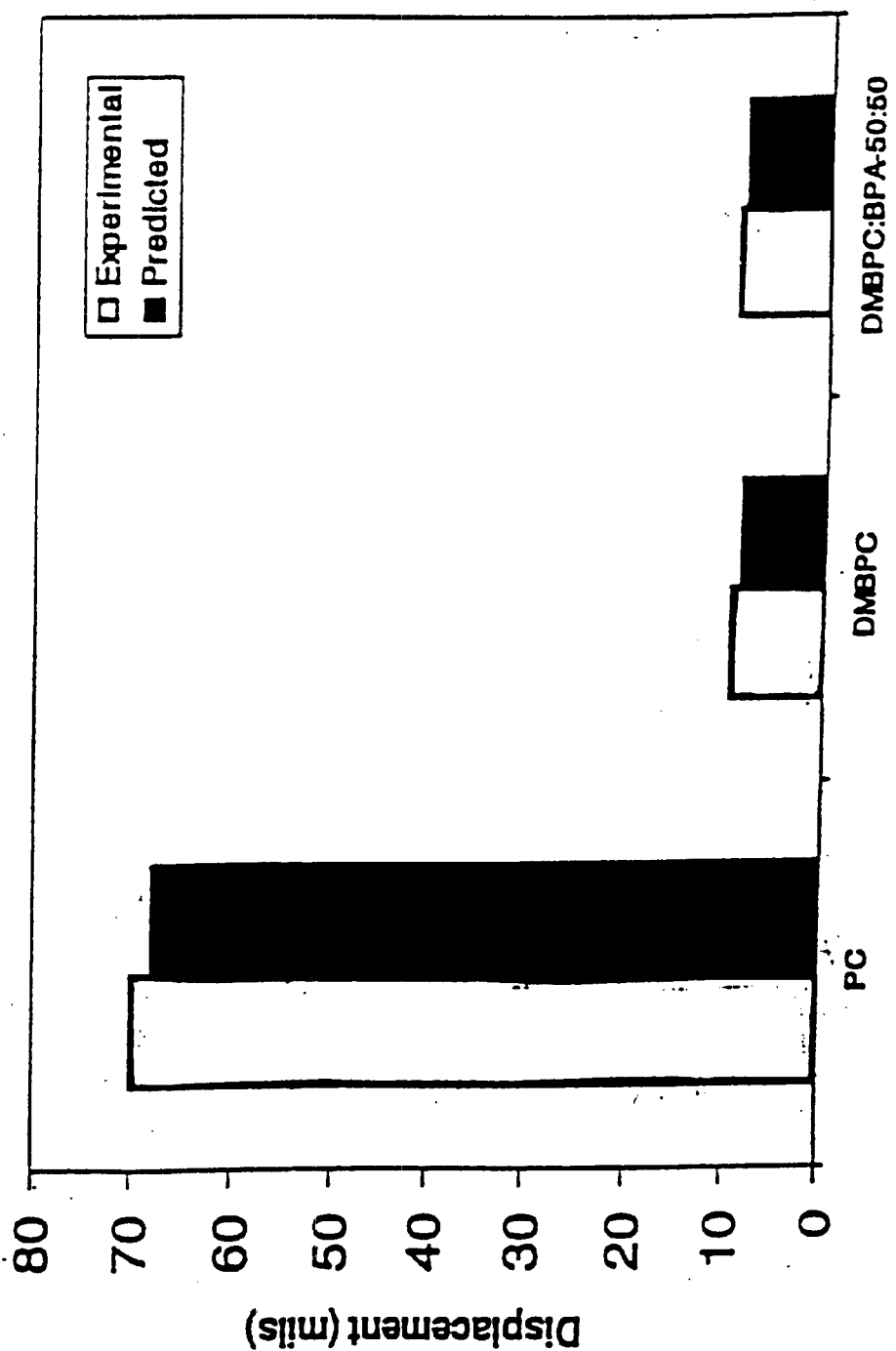
FIG. 8 is a graph of experimental and predicted vibration response of polycarbonate, 1,1-bis(4-hydroxy-3-methyl phenyl) cyclohexane polycarbonate (DMBPC-PC), and DMBPC/BPA-PC copolymer disks with 130 mm outer diameter and 40 mm inner diameter and 1.2 mm thickness.

FIG. 8 shows a comparison between the experimental and predicted vibration response of disks with 130 mm outer diameter and 40 mm inner diameter and 1.2 mm thickness. Results indicate good agreement between experimental and predicted values of maximum values of disk displacement. The disks used in these tests were injection molded. The maximum disk displacement under 1 G peak-peak sinusoidal loading was measured using a test setup consisting of a shaker (used to apply vibratory loads on the disk), an accelerometer (used to measure disk acceleration), a laser doppler vibrometer (used to measure velocity at the outer diameter of disk) and a spectrum analyzer (used to collect and analyze data).

While typical embodiments have been set forth for the purpose of illustration, the foregoing descriptions should not be deemed to be a limitation on the scope of the present invention. Accordingly, various modifications, adaptations, and alternatives may occur to one skilled in the art without departing from the spirit and scope of the present invention.

What is claimed is:

1. A storage medium for data, the storage medium comprising:
   1) a substrate, a physical portion of which comprises at least one polycarbonate, and 2) at least one data layer on the substrate;
the at least one polycarbonate comprising repeating units selected from the group consisting of structure (I), structure (IV), and combinations thereof:

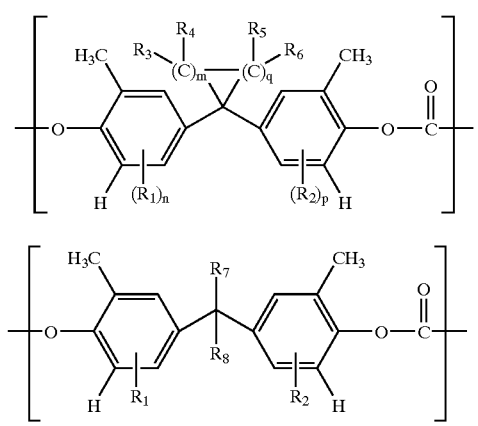

where
$R_1$, $R_2$, $R_3$, $R_4$, $R_5$, and $R_6$ are independently selected from the group consisting of $C_1$–$C_6$ alkyl and hydrogen;
$R_7$ and $R_8$ are independently selected from the group consisting of $C_1$–$C_6$ alkyl, phenyl, $C_1$–$C_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2; and
p is an integer selected from the group consisting of 1 and 2;
provided when only repeating units having structure (IV) are present, one of $R_7$ and $R_8$ is other than $CH_3$.

2. The storage medium in accordance with claim 1, wherein the polycarbonate comprises structure (I).

3. The storage medium in accordance with claim 2, wherein structure (I) comprises 1,1-bis(4-hydroxy-3-methyl phenyl) cyclohexane.

4. The storage medium in accordance with claim 1, wherein the polycarbonate comprises structure (IV).

5. The storage medium in accordance with claim 4, wherein the polycarbonate comprises 1,1-bis(4-hydroxy-3-methyl phenyl) cyclohexane.

6. The storage medium in accordance with claim 1, wherein the polycarbonate has a mechanical damping coefficient of at least about 0.04 at room temperature in a frequency range between about 1 hertz and about 500 hertz.

7. The storage medium in accordance with claim 6, wherein the polycarbonate has a mechanical damping coefficient of at least about 0.1 at room temperature in a frequency rang e between about 1 hertz and about 500 hertz.

8. The storage medium in accordance with claim 1, wherein the polycarbonate has a number average molecular weight in a range between about 10,000 and about 100,000 as determined by gel permeation chromatography relative to polystyrene.

9. The storage medium in accordance with claim 8, wherein the polycarbonate has a number average molecular weight in a range between about 10,000 and about 50,000 as determined by gel permeation chromatography relative to polystyrene.

10. The storage medium in accordance with claim 9, wherein the polycarbonate has a number average molecular weight in a range between about 12,000 and about 40,000 as determined by gel permeation chromatography relative to polystyrene.

11. The storage medium in accordance with claim 1, wherein the polycarbonate comprises structure (I), (IV), or combinations thereof in a range between about 5 mol % and about 100 mol %.

12. The storage medium in accordance with claim 11, wherein the polycarbonate comprises structure (I), (IV), or combinations thereof in an amount greater than about 40 mol %.

13. A storage medium for data, the storage medium comprising:
1) a substrate, a physical portion of which comprises at least one polycarbonate, and
2) at least one data layer on the substrate;
the polycarbonate portion comprising residues of structure (VI):

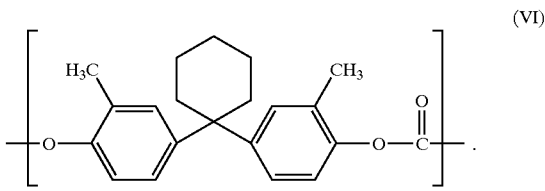

14. The storage medium in accordance with claim 13, wherein the polycarbonate comprises structure (VI) in a range between about 5 mol % and about 100 mol %.

15. The storage medium in accordance with claim 14, wherein the polycarbonate comprises structure (VI) in an amount greater than about 40 mol %.

16. The storage medium in accordance with claim 14, wherein the polycarbonate has a mechanical damping coefficient of at least about 0.1 at room temperature in a frequency range between about 1 hertz and about,500 hertz.

17. The storage medium in accordance with claim 14, wherein the polycarbonate has a number average molecular weight in a range between about 12,000 and about 40,000 relative to polystyrene.

18. A storage medium for data, the storage medium comprising:
1) a substrate, a physical portion of which comprises a polycarbonate;
2) at least one data layer on the substrate;
the polycarbonate comprising:
A) carbonate structural units corresponding to structure (I), (IV), or combinations thereof:

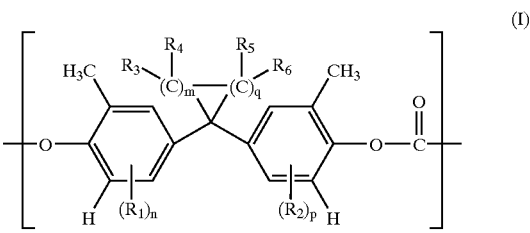

-continued

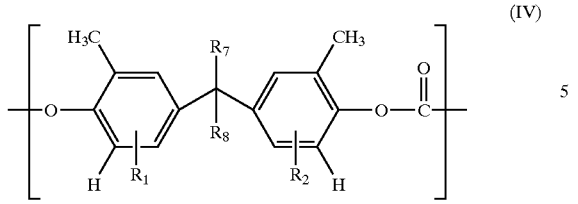

where
$R_1, R_2, R_3, R_4, R_5$, and $R_6$ are independently selected from the group consisting of $C_1$–$C_6$ alkyl and hydrogen;
$R_7$ and $R_8$ are independently selected from the group consisting of $C_1$–$C_6$ alkyl, phenyl, $C_1$–$C_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2;
p is an integer selected from the group consisting of 1 and 2; and B) carbonate structural units corresponding to structure (II)

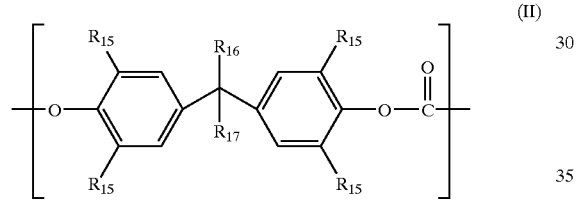

where each $R_{15}$ is selected independently from the group consisting of H and $C_1$–$C_3$ alkyl, and $R_{16}$ and $R_{17}$ are independently $C_1$–$C_6$ alkyl or aryl.

19. The storage medium in accordance with claim 18, wherein the polycarbonate comprises structure (I), (IV), or combinations thereof in a range between about 5 mol % and about 100 mol %.

20. The storage medium in accordance with claim 19, wherein the polycarbonate comprises structure (I), (IV), or combinations thereof in an amount greater than about 40 mol %.

21. The storage medium in accordance with claim 18, wherein the polycarbonate has a mechanical damping coefficient of at least about 0.04 at room temperature in a frequency range between about 1 hertz and about 500 hertz.

22. The storage medium in accordance with claim 21, wherein the polycarbonate has a mechanical damping coefficient of at least about 0.1 at room temperature in a frequency range between about 1 hertz and about 500 hertz.

23. The storage medium in accordance with claim 18, wherein structure (I) comprises 1,1-bis(4-hydroxy-3-methyl phenyl) cyclohexane.

24. The storage medium in accordance with claim 18, wherein structure (IV) comprises 2,2-bis(4-hydroxy-3-methyl)propane.

25. The storage medium in accordance with claim 18, wherein structure (II) comprise 2,2-bis(4-hydroxyphenyl) propane.

26. A storage medium for data, the storage medium comprising:

1) a substrate, a physical portion of which comprises at least one polycarbonate, and
2) at least one data layer on the substrate;

the polycarbonate portion comprising:
A) carbonate structural units selected from the group consisting of structure (I), structure (IV), and combinations thereof:

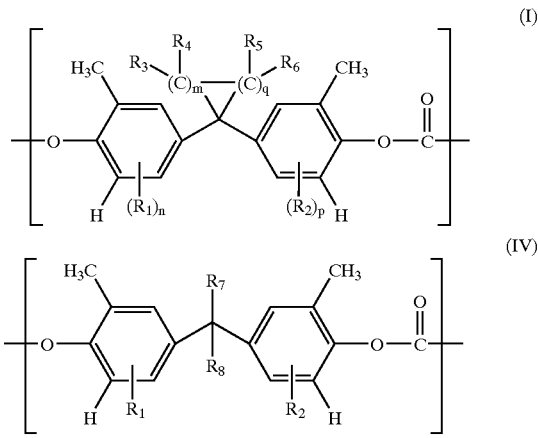

where
$R_1, R_2, R_3, R_4, R_5$, and $R_6$ are independently selected from the group consisting of $C_1$–$C_6$ alkyl and hydrogen;
$R_7$ and $R_8$ are independently selected from the group consisting of $C_1$–$C_6$ alkyl, phenyl, $C_1$–$C_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2;
p is an integer selected from the group consisting of 1 and 2; and B) carbonate structural units corresponding to structure (III)

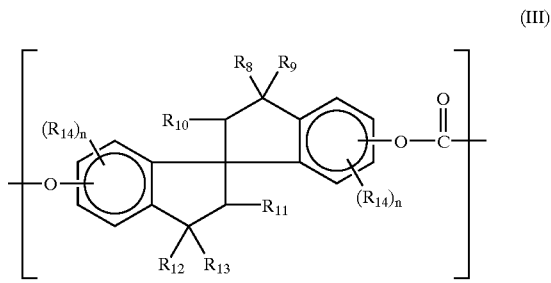

where
$R_8, R_9, R_{12}$ and $R_{13}$ are independently $C_1$–$C_6$ alkyl;
$R_{10}$ and $R_{11}$ are independently H or $C_1$–$C_5$ alkyl;
each $R_{14}$ is independently selected from the group consisting of H and $C_1$–$C_3$ alkyl; and
each n is independently selected from the group consisting of 0, 1 and 2.

27. The storage medium in accordance with claim 26, wherein the polycarbonate comprises structure (I), (IV), or combinations thereof in a range between about 5 mol % and about 100 mol %.

28. The storage medium in accordance with claim 27, wherein the polycarbonate comprises structure (I), (IV), or combinations thereof in an amount greater than about 40 mol %.

29. The storage medium in accordance with claim 26, wherein the polycarbonate has a mechanical damping coefficient of at least about 0.04 at room temperature in a frequency range between about 1 hertz and about 500 hertz.

30. The storage medium in accordance with claim 29, wherein the polycarbonate has a mechanicas damping coefficient of at least about 0.1 at room temperature in a frequency range between about 1 hertz and about 500 hertz.

31. The storage medium in accordance with claim 26, wherein structure (I) comprises 1,1-bis(4-hydroxy-3-methyl phenyl) cyclohexane.

32. The storage medium in accordance with claim 26, wherein structure (IV) comprises 2,2-bis(4-hydroxy-3-methyl)propane.

33. The storage medium in accordance with claim 26, wherein structure (III) comprises 6,6'-dihydroxy-3,3,3',3'-tetramethylspirobiindane.

34. A polycarbonate composition with improved damping performance which comprises at least one compound having repeating units selected from the group consisting of structure (I), structure (IV), and combinations thereof:

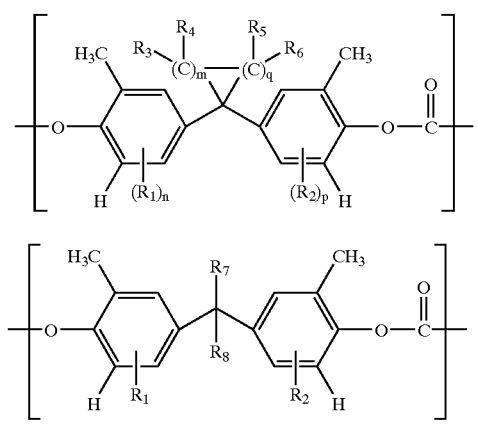

where
R$_1$, R$_2$, R$_3$, R$_4$, R$_5$, and R$_6$ are independently selected from the group consisting of C$_1$–C$_6$ alkyl and hydrogen;
R$_7$ and R$_8$ are independently selected from the group consisting of C$_1$–C$_6$ alkyl, phenyl, C$_1$–C$_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2; and
p is an integer selected from the group consisting of 1 and 2;
provided when only repeating units having structure (IV) are present, one of R$_7$ and R$_8$ is other than CH$_3$.

35. The polycarbonate composition in accordance with claim 34, which comprises structure (I).

36. The polycarbonate composition in accordance with claim 35, wherein structure (I) comprises 1,1-bis(4-hydroxy-3-methyl phenyl) cyclohexane.

37. The polycarbonate composition in accordance with claim 34, which comprises structure (IV).

38. The polycarbonate composition in accordance with claim 37, wherein structure (IV) comprises 2,2-bis(4-hydroxy-3-methyl)propane.

39. The polycarbonate composition in accordance with claim 34 having a mechanical damping coefficient of at least about 0.04 at room temperature in a frequency range between about 1 hertz and about 500 hertz.

40. The polycarbonate composition in accordance with claim 39 having a mechanical damping coefficient of at least about 0.1 at room temperature in a frequency range between about 1 hertz and about 500 hertz.

41. The polycarbonate composition in accordance with claim 34, wherein the polycarbonate has a number average molecular weight in a range between about 10,000 and about 100,000 relative to polystyrene.

42. The polycarbonate composition in accordance with claim 41, wherein the polycarbonate has a number average molecular weight in a range between about 10,000 and about 50,000 relative to polystyrene.

43. The polycarbonate composition in accordance with claim 42, wherein the polycarbonate has a number average molecular weight in a range between about 12,000 and about 40,000 relative to polystyrene.

44. A polycarbonate composition with improved damping performance which comprises at least one compound of structure (VI):

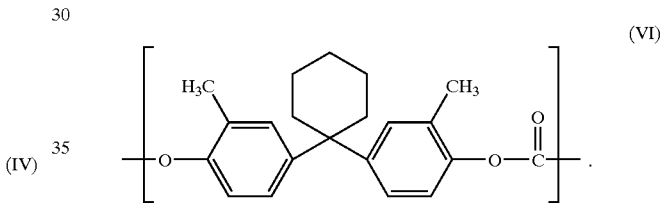

45. The polycarbonate composition in accordance with claim 44 comprising structure (VI) in a range between about 5 mol % and about 100 mol %.

46. The polycarbonate composition in accordance with claim 45 comprising structure (VI) in an amount greater than about 40 mol %.

47. The polycarbonate composition in accordance with claim 44 having a mechanical damping coefficient of at least about 0.1 at room temperature in a frequency range between about 1 hertz and about 500 hertz.

48. The polycarbonate composition in accordance with claim 44, wherein the polycarbonate has a number average molecular weight in a range between about 12,000 and about 40,000 relative to polystyrene.

49. A polycarbonate composition with improved damping performance which comprises at least one compound having repeating units selected from the group consisting of structure (I), structure (IV), and combinations thereof:

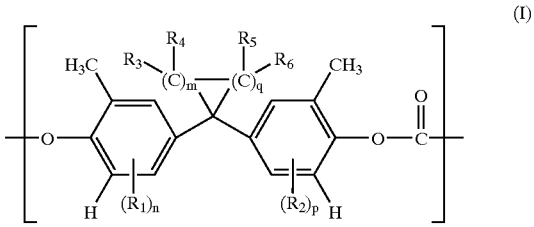

-continued

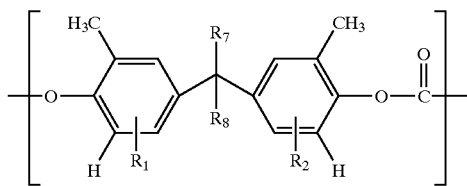
(IV)

where
R$_1$, R$_2$, R$_3$, R$_4$, R$_5$, and R$_6$ are independently selected from the group consisting of C$_1$–C$_6$ alkyl and hydrogen;
R$_7$ and R$_8$ are independently selected from the group consisting of C$_1$–C$_6$ alkyl, phenyl, C$_1$–C$_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2;
p is an integer selected from the group consisting of 1 and 2; and
B) carbonate structural units corresponding to structure (II)

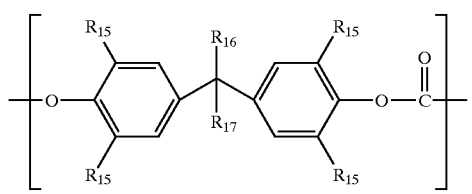
(II)

where each R$_{15}$ is selected independently from the group consisting of H and C$_1$–C$_3$ alkyl, and R$_{16}$ and R$_{17}$ are independently C$_1$–C$_6$ alkyl or aryl.

50. The polycarbonate composition in accordance with claim 49 comprising structure (I), (IV), or combinations thereof in a range between about 5 mol % and about 99 mol %.

51. The polycarbonate composition in accordance with claim 50 comprising structure (I), (IV), or combinations thereof in a range between about 40 mol % and about 99 mol %.

52. The polycarbonate composition in accordance with claim 49 having a mechanical damping coefficient of at least about 0.04 at room temperature in a frequency range between about 1 hertz and about 500 hertz.

53. The polycarbonate composition in accordance with claim 52 having a mechanical damping coefficient of at least about 0.1 at room temperature in a frequency range between about 1 hertz and about 500 hertz.

54. The polycarbonate composition in accordance with claim 49, wherein structure (I) comprises 1,1-bis(4-hydroxy-3-methyl phenyl) cyclohexane.

55. The polycarbonate composition in accordance with claim 49, wherein structure (IV) comprises 2,2-bis(4-hydroxy-3-methyl)propane.

56. The polycarbonate composition in accordance with claim 49, wherein structure (II) comprise 2,2-bis(4-hydroxyphenyl)propane.

57. A polycarbonate composition with improved damping performance which comprises at least one compound having repeating units selected from the group consisting of structure (I), structure (IV), and combinations thereof:

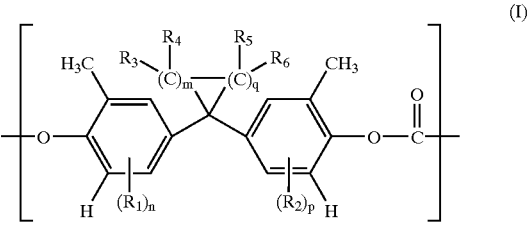
(I)

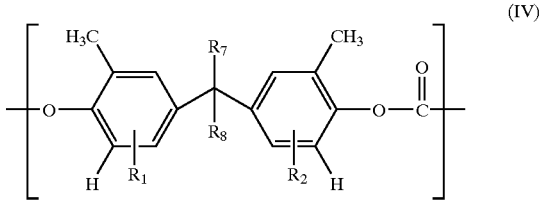
(IV)

where
R$_1$, R$_2$, R$_3$, R$_4$, R$_5$, and R$_6$ are independently selected from the group consisting of C$_1$–C$_6$ alkyl and hydrogen;
R$_7$ and R$_8$ are independently selected from the group consisting of C$_1$–C$_6$ alkyl, phenyl, C$_1$–C$_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2;
p is an integer selected from the group consisting of 1 and 2; and
B) carbonate structural units corresponding to structure (III)

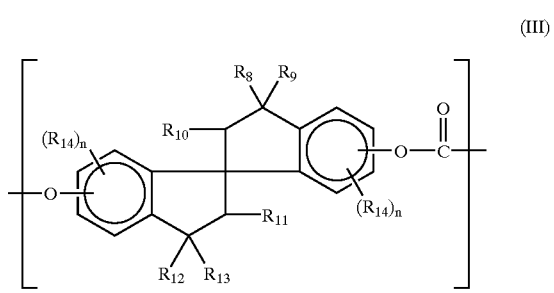
(III)

where
R$_8$, R$_9$, R$_{12}$ and R$_{13}$ are independently C$_1$–C$_6$ alkyl;
R$_{10}$ and R$_{11}$ are independently H or C$_1$–C$_5$ alkyl;
each R$_{14}$ is independently selected from the group consisting of H and C$_1$–C$_3$ alkyl; and
each n is independently selected from the group consisting of 0, 1 and 2.

58. The polycarbonate composition in accordance with claim 57 comprising structure (I), (IV), or combinations thereof in a range between about 5 mol % and about 99 mol %.

59. The polycarbonate composition in accordance with claim 58 comprising structure (I), (IV), or combinations thereof in a range between about 40 mol % and about 99 mol %.

60. The polycarbonate composition in accordance with claim 57 having a mechanical damping coefficient of at least about 0.04 at room temperature in a frequency range between about 1 hertz and about 500 hertz.

61. The polycarbonate composition in accordance with claim 60 having a mechanical damping coefficient of at least about 0.1 at room temperature in a frequency range between about 1 hertz and about 500 hertz.

62. The polycarbonate composition in accordance with claim 57, wherein structure (I) comprises 1,1-bis(4-hydroxy-3-methyl phenyl) cyclohexane.

63. The polycarbonate composition in accordance with claim 57, wherein structure (IV) comprises 2,2-bis(4-hydroxy-3-methyl)propane.

64. The polycarbonate composition in accordance with claim 57, wherein structure (III) comprises 6,6'-dihydroxy-3,3,3',3'-tetramethylspirobiindane.

65. A method for improving the damping performance of an article, the method comprising constructing the article of a polycarbonate with at least one compound of structure (I), (IV), or combinations thereof:

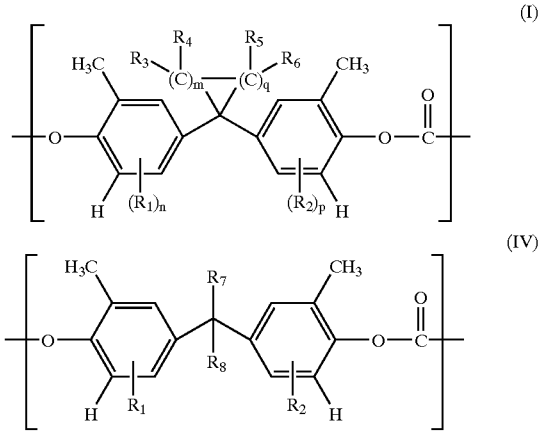

where
R$_1$, R$_2$, R$_3$, R$_4$, R$_5$, and R$_6$ are independently selected from the group consisting of C$_1$–C$_6$ alkyl and hydrogen;
R$_7$ and R$_8$ are independently selected from the group consisting of C$_1$–C$_6$ alkyl, phenyl, C$_1$–C$_6$ alkyl substituted phenyl, or hydrogen;
m is an integer in a range between 0 and about 12;
q is an integer in a range between 0 and about 12;
m+q is an integer in a range between about 4 and about 12;
n is an integer selected from the group consisting of 1 and 2; and
p is an integer selected from the group consisting of 1 and 2.

66. The method in accordance with claim 65, wherein the polycarbonate comprises structure (I).

67. The method in accordance with claim 66, wherein structure (I) comprises 1,1-bis(4-hydroxy-3-methyl phenyl) cyclohexane.

68. The method in accordance with claim 66, wherein the polycarbonate comprises structure (IV).

69. The method in accordance with claim 68, wherein structure (IV) comprises 2,2-bis(4-hydroxy-37methyl) propane.

70. The method in accordance with claim 65, wherein the polycarbonate has a mechanical damping coefficient of at least about 0.04 at room temperature in a frequency range between about 1 hertz and about 500 hertz.

71. The method in accordance with claim 70, wherein the polycarbonate has a mechanical damping coefficient of at least about 0.1 at room temperature in a frequency range between about 1 hertz and about 500 hertz.

72. The method in accordance with claim 65, wherein the polycarbonate has a number average molecular weight in a range between about 10,000 and about 100,000 relative to polystyrene.

73. The method in accordance with claim 72, wherein the polycarbonate has a number average molecular weight in a range between about 10,000 and about 50,000 relative to polystyrene.

74. The method in accordance with claim 73, wherein the polycarbonate has a number average molecular weight in a range between about 12,000 and about 40,000 relative to polystyrene.

75. The method in accordance with claim 65, wherein the polycarbonate comprises structure (I), (IV), or combinations thereof in a range between about 5 mol % and about 99 mol %.

76. The method in accordance with claim 75, wherein the polycarbonate comprises structure (I), (IV), or combinations thereof in a range between about 40 mol % and about 99 mol %.

77. The method in accordance with claim 65, wherein the article comprises a storage medium for data.

78. A method for improving the damping performance of an article, the method comprising constructing the article of a polycarbonate with at least one compound of structure (VI):

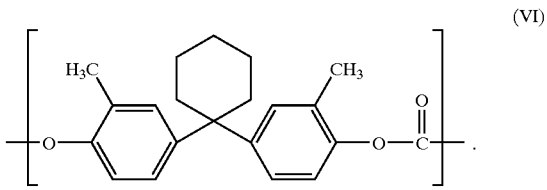

79. The method in accordance with claim 78, wherein the polycarbonate comprises structure (VI) in a range between about 5 mol % and about 100 mol %.

80. The method in accordance with claim 79, wherein the polycarbonate comprises structure (VI) in an amount greater than about 40 mol %.

81. The method in accordance with claim 78, wherein the polycarbonate has a mechanical damping coefficient of at least about 0.1 at room temperature in a frequency range between about 1 hertz and about 500 hertz.

82. The method in accordance with claim 78, wherein the polycarbonate has a number average molecular weight in a range between about 12,000 and about 40,000 relative to polystyrene.

83. The method in accordance with claim 78, wherein the article comprises a storage medium disk for data.

84. A method for improving the damping performance of an article, the method comprising constructing the article of a polycarbonate with at least one compound comprising repeating units selected from the group consisting of structure (I), structure (IV), and combinations thereof:

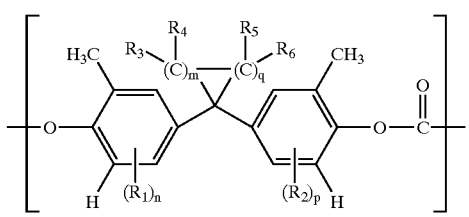

(I)

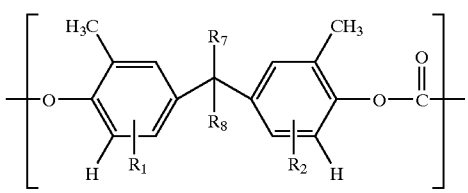

(IV)

where
- $R_1$, $R_2$, $R_3$, $R_4$, $R_5$, and $R_6$ are independently selected from the group consisting of $C_1$–$C_6$ alkyl and hydrogen;
- $R_7$ and $R_8$ are independently selected from the group consisting of $C_1$–$C_6$ alkyl, phenyl, $C_1$–$C_6$ alkyl substituted phenyl, or hydrogen;
- m is an integer in a range between 0 and about 12;
- q is an integer in a range between 0 and about 12;
- m+q is an integer in a range between about 4 and about 12;
- n is an integer selected from the group consisting of 1 and 2;
- p is an integer selected from the group consisting of 1 and 2; and
- B) carbonate structural units corresponding to structure (II)

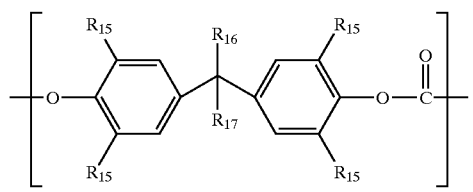

(II)

where each $R_{15}$ is selected independently from the group consisting of H and $C_1$–$C_3$ alkyl, and $R_{16}$ and $R_{17}$ are independently $C_1$–$C_6$ alkyl or aryl.

85. The method in accordance with claim 84, wherein the polycarbonate comprises structure (I), (IV), or combinations thereof in a range between about 5 mol % and about 99 mol %.

86. The method in accordance with claim 85, wherein the polycarbonate comprises structure (I), (IV), or combinations thereof in a range between about 40 mol % and about 99 mol %.

87. The method in accordance with claim 84, wherein the polycarbonate has a mechanical damping coefficient of at least about 0.04 at room temperature in a frequency range between about 1 hertz and about 500 hertz.

88. The method in accordance with claim 87, wherein the polycarbonate has a mechanical damping coefficient of at least about 0.1 at room temperature in a frequency range between about 1 hertz and about 500 hertz.

89. The method in accordance with claim 84, wherein structure (I) comprises 1,1-bis(4-hydroxy-3-methyl phenyl) cyclohexane.

90. The method in accordance with claim 84, wherein structure (IV) comprises 2,2-bis(4-hydroxy-3-methyl) propane.

91. The method in accordance with claim 84, wherein structure (II) comprise 2,2-bis(4-hydroxyphenyl)propane.

92. The method in accordance with claim 84, wherein the article comprises a storage medium for data.

93. A method for improving the damping performance of an article, the method comprising constructing the article of a polycarbonate comprising repeating units selected from the group consisting of structure (I), structure (IV), and combinations thereof:

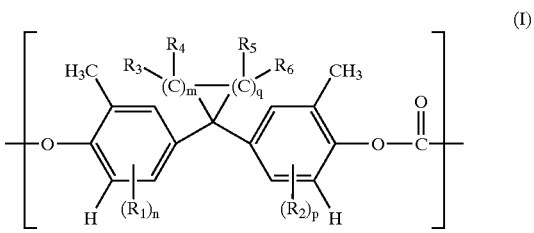

(I)

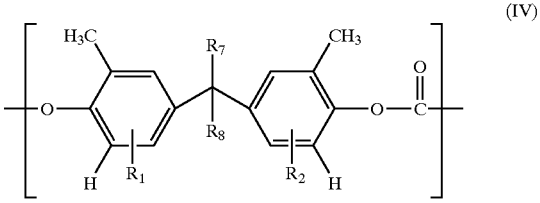

(IV)

where
- $R_1$, $R_2$, $R_3$, $R_4$, $R_5$, and $R_6$ are independently selected from the group consisting of $C_1$–$C_6$ alkyl and hydrogen;
- $R_7$ and $R_8$ are independently selected from the group consisting of $C_1$–$C_6$ alkyl, phenyl, $C_1$–$C_6$ alkyl substituted phenyl, or hydrogen;
- m is an integer in a range between 0 and about 12;
- q is an integer in a range between 0 and about 12;
- m+q is an integer in a range between about 4 and about 12;
- n is an integer selected from the group consisting of 1 and 2;
- p is an integer selected from the group consisting of 1 and 2; and
- B) carbonate structural units corresponding to structure (III)

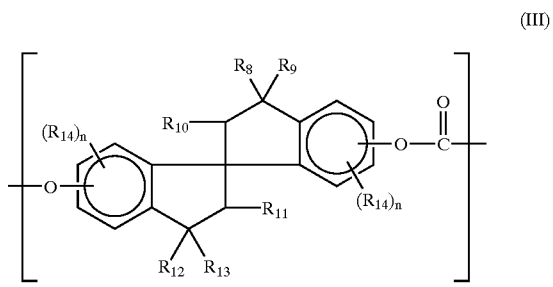

(III)

where
- $R_8$, $R_9$, $R_{12}$ and $R_{13}$ are independently $C_1$–$C_6$ alkyl;
- $R_{10}$ and $R_{11}$ are independently H or $C_1$–$C_5$ alkyl;
- each $R_{14}$ is independently selected from the group consisting of H and $C_1$–$C_3$ alkyl; and each n is independently selected from the group consisting of 0, 1 and 2.

94. The method in, accordance with claim 93, wherein the polycarbonate comprises structure (I), (IV), or combinations thereof in a range between about 5 mol % and about 99 mol %.

95. The method in accordance with claim 94, wherein the polycarbonate comprises structure (I), (IV), or combinations thereof in a range between about 40 mol % and about 99 mol %.

96. The method in accordance with claim 93, wherein the polycarbonate has a mechanical damping coefficient of at least about 0.04 at room temperature in a frequency range between about 1 hertz and about 500 hertz.

97. The method in accordance with claim 96, wherein the polycarbonate has a mechanical damping coefficient of at least about 0.1 at room temperature in a frequency range between about 1 hertz and about 500 hertz.

98. The method in accordance with claim 93, wherein structure (I) comprises 1,1-bis(4-hydroxy-3-methyl phenyl) cyclohexane.

99. The method in accordance with claim 93, wherein structure (IV) comprises 2,2-bis(4-hydroxy-3-methyl) propane.

100. The method in accordance with claim 93, wherein structure (III) comprises 6,6'-dihydroxy-3,3,3',3'-tetramethylspirobiindane.

101. The method in accordance with claim 93, wherein the article comprises a storage medium for data.

* * * * *